(12) United States Patent
Zimmer et al.

(10) Patent No.: US 7,127,579 B2
(45) Date of Patent: Oct. 24, 2006

(54) HARDENED EXTENDED FIRMWARE INTERFACE FRAMEWORK

(75) Inventors: Vincent J. Zimmer, Federal Way, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 10/107,882

(22) Filed: Mar. 26, 2002

(65) Prior Publication Data

US 2003/0188173 A1 Oct. 2, 2003

(51) Int. Cl.
*G06F 12/00* (2006.01)

(52) U.S. Cl. .......................... 711/163; 713/2; 713/156; 713/164; 713/169; 713/193; 711/159; 711/203; 726/4; 726/5; 726/16; 726/21; 726/24; 714/36; 714/38

(58) Field of Classification Search ................ 711/159, 711/203; 712/244; 713/1, 156, 164, 169, 713/189, 2, 193; 714/25, 36, 38; 705/55; 380/2; 726/16, 21, 22, 23, 24, 26, 4, 5
See application file for complete search history.

(56) References Cited

U.S. PATENT DOCUMENTS

| | | | | |
|---|---|---|---|---|
| 5,421,006 A | * | 5/1995 | Jablon et al. ................ | 714/36 |
| 6,389,540 B1 | * | 5/2002 | Scheifler et al. .............. | 726/21 |
| 6,978,018 B1 | * | 12/2005 | Zimmer ........................ | 380/30 |
| 2002/0099952 A1 | * | 7/2002 | Lambert et al. ............ | 713/200 |
| 2002/0147923 A1 | * | 10/2002 | Dotan ......................... | 713/200 |
| 2003/0126453 A1 | * | 7/2003 | Glew et al. .................. | 713/193 |
| 2005/0114639 A1 | * | 5/2005 | Zimmer ....................... | 712/244 |
| 2005/0160281 A1 | * | 7/2005 | Thibadeau ................... | 713/189 |

\* cited by examiner

*Primary Examiner*—Matthew Kim
*Assistant Examiner*—Chase W. Peers
(74) *Attorney, Agent, or Firm*—Blakely, Sokoloff, Taylor & Zafman LLP

(57) ABSTRACT

A method of system for hardening a firmware environment. A trusted core framework of firmware components are segregated from initially non-trustworthy extended firmware components such that the trusted core components are executed in a privileged processor mode, while the extended firmware components are executed in a non-privileged processor mode. An authentication of each extended firmware component is made to determine whether it is secure or non-secure. Through a memory code fault mechanism, memory accesses made by the extended firmware components are trapped, and a determination is made to whether the memory accesses should be allowed based on whether the extended firmware component is secure or non-secure and whether the requested memory page was allocated by the trusted core or a secure extended firmware component. This segregation scheme prevents non-trusted firmware from accessing privileged memory, thereby preventing rogue, errant, or malicious firmware from damaging the trusted core framework.

32 Claims, 8 Drawing Sheets

HARDENED EXTENDED FIRMWARE INTERFACE FRAMEWORK

BACKGROUND OF THE INVENTION

1. Field of the Invention

The present invention concerns computer platform firmware in general, and concerns a method for hardening an extensible firmware framework that permits the use of third party firmware modules in particular.

2. Background Information

Computer platform firmware is used during initialization of computer systems to verify system integrity and configuration. It also generally provides the basic low-level interface between hardware and software components of those computer systems, enabling specific hardware functions to be implemented via execution of higher-level software instructions contained in computer programs that run on the computer systems. in many computers, a primary portion of this firmware is known as the Basic Input/Output System (BIOS) code of a computer system. The BIOS code comprises a set of permanently recorded (or semi-permanently recorded in the case of systems that use flash BIOS) software routines that provides the system with its fundamental operational characteristics, including instructions telling the computer how to test itself when it is turned on, and how to determine the configurations for various built-in components and add-on peripherals.

In a typical PC architecture, the BIOS is generally defined as the firmware that runs between the processor reset and the first instruction of the Operating System (OS) loader. This corresponds to the startup operations performed during a cold boot or in response to a system reset. At the start of a cold boot, very little of the system beyond the processor and firmware is actually initialized. It is up to the code in the firmware to initialize the system to the point that an operating system loaded off of media, such as a hard disk, can take over.

Typically, firmware code is stored in a "monolithic" form comprising a single set of code that is provided by a platform manufacturer or a BIOS vendor such as Phoenix or AMI. Various portions of the single set of code are used to initialize different system components. Since there is only a single set of code, the trustworthiness and reliability of the firmware may be verified through testing by its producer. In other situations, a monolithic BIOS may be extended using one or more "Option ROMs" that are contained on one or more periphery device cards. For example, SCSI device driver cards and video cards often include an option ROM that contains BIOS code corresponding to services provided by these cards. Typically, firmware in option ROMs is loaded after the firmware in the monolithic BIOS has been loaded or during loading of the monolithic BIOS in accordance with a predefined scheme.

Recently, a new firmware architecture has been defined that enables platform firmware to include firmware "modules" and "drivers" that may be provided by one or more third party vendors in addition to the firmware provided by a platform manufacturer or BIOS vendor that is originally supplied with a computer system. This firmware architecture, as defined by the EFI (Extensible Firmware Interface) 2.0 framework specification, enables a system's firmware to be "extended" beyond conventional firmware capabilities through the use of the third-party firmware modules and drivers.

Although the EFI 2.0 framework provides many advantages, it opens up the opportunity for a system to be disabled or damaged through use of an errant or rogue firmware module or driver. For example, a flawed firmware module may not operate properly, causing one or more system components to be disabled. Even worse, it may cause problems to the operation of other firmware components and modules.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

A framework and method for hardening an extended firmware interface. In the following description, numerous specific details are disclosed to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
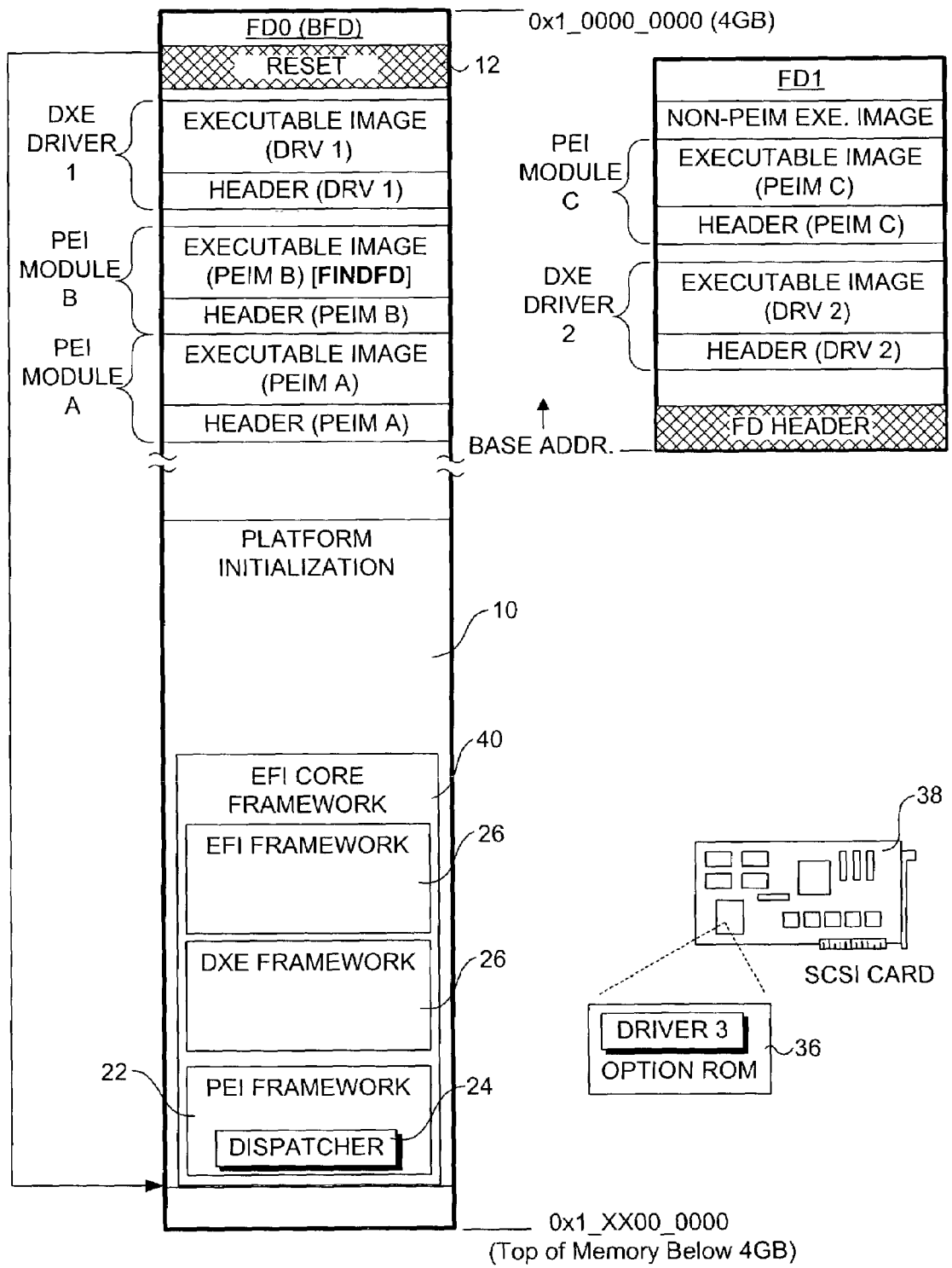
FIG. 1 is a schematic diagram of a boot firmware device, an additional firmware device, and a peripheral card with an option ROM, illustrating exemplary storage locations for firmware components that are implemented to produce a trusted EFI core framework in accordance with one embodiment of the invention.
Figure 2:
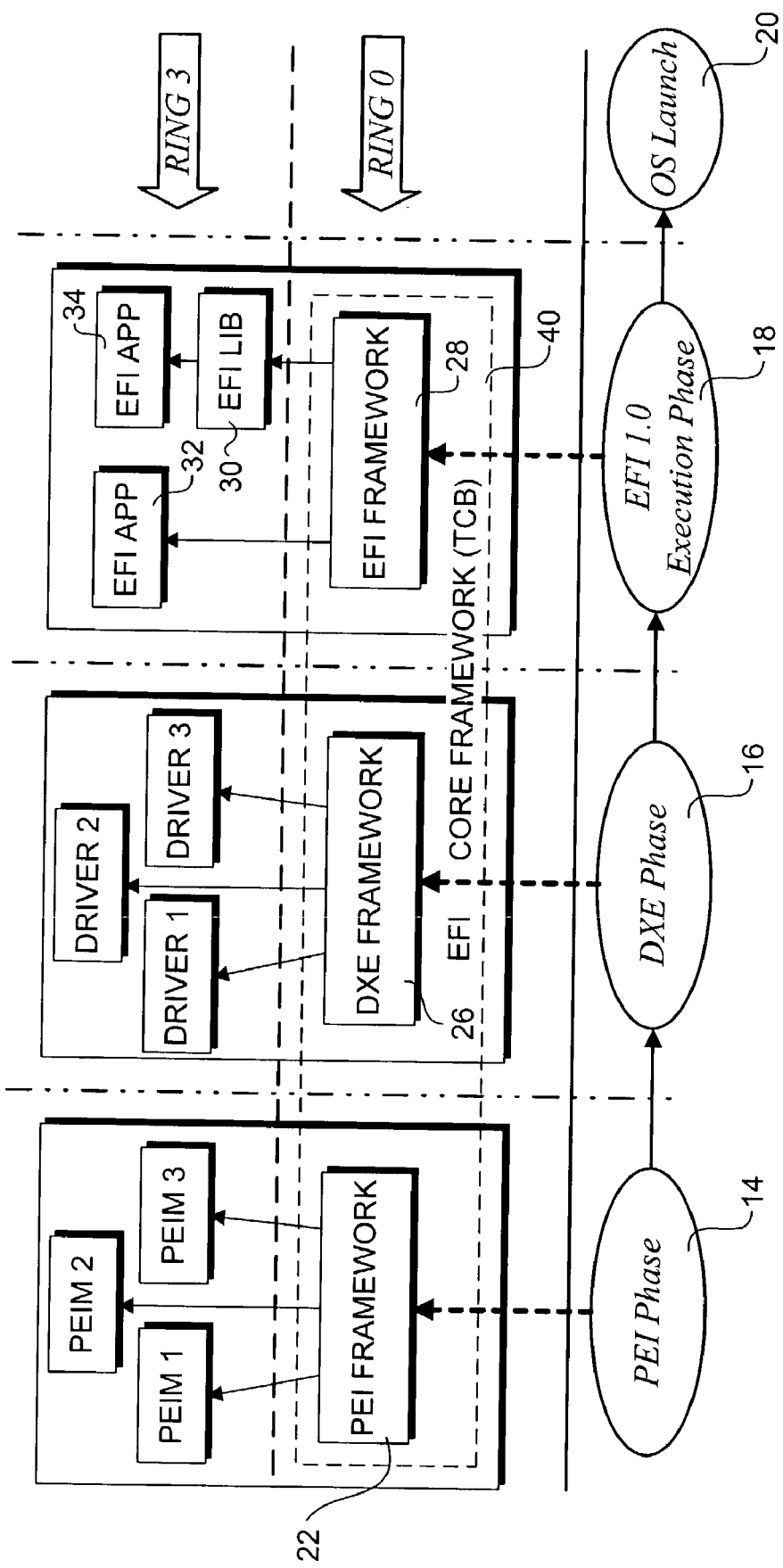
FIG. 2 is a block schematic diagram illustrating a segregated multi-phase computer system initialization scheme in which trusted core firmware components are executed in a privileged execution mode and extended firmware components are executed in a non-privileged execution mode.

With reference to FIG. 1, in response to a cold boot or system reset, the instruction pointer of a computer system's microprocessor is directed to the first instruction in a set of platform initialization firmware code 10 that is stored on a firmware device (FD) 0. This firmware device, often referred to as the BIOS chip, comprise the boot firmware device (BFD) for the system. Execution of the platform initialization firmware begins at a reset code portion 12, and proceeds sequentially until all of the firmware to initialize the computer system has been executed. Under the EFI 2.0 architecture, this initialization process includes various execution phases of the firmware, as shown in FIG. 2. These execution phases, which include a Pre-EFI Initialization (PEI) phase 14, a Driver eXecution Environment (DXE) phase 16, and an EFI 1.0 execution phase 18, enable initialization and set-up of various platform devices and services, and enable an operating system (OS) to be booted in accordance with an OS launch phase 20.

The PEI phase is responsible for main memory initialization and setting up enough of the platform fabric and resources to hand-off control to the DXE phase. As such, the firmware code that is executed to perform the PEI phase includes an Instruction Set Architecture (ISA)-specific PEI core 22, which is also referred to as PEI framework 22. The PEI framework includes firmware corresponding to a dispatcher 24, which upon execution is used, to locate and dispatch for execution one or more Pre-EFI initialization modules, also referred to herein as PEI Modules or PEIMs. Firmware code in the PEIMs is used to abstract the particular platform, chipset, and policy abstractions from the baseboard.

During the DXE phase, an ISA-specific DXE core (i.e., DXE framework 26) is executed, enabling one or more DXE drivers to be loaded. The DXE drivers are responsible for providing input/output (I/O) services, such as block device abstraction, consoles, and the EFI file system. These drivers include a distinguished driver called the Boot-Device Selection (BDS) that is responsible for abstracting the operation system load and console selection policy.

During the EFI 1.0 execution phase, firmware code corresponding to an EFI framework 28 that provides core EFI operations is executed. The EFI framework also registers an EFI library 30, and one or more EFI applications. The EFI applications are non-persistent executable images that are used for transient services, such as platform setup, clock setting, etc.

Each of the PEIMs and the DXE drivers may be provided by the microprocessor vendor (e.g., Intel), the platform manufacturer or integrator (e.g., Hewlett-Packard, Dell, Compaq, etc.), a BIOS vendor (e.g., AMI, Phoenix, etc.), or an independent third party. Firmware code corresponding to the PEIMs and DXE drivers provided by a microprocessor vendor or platform manufacturer will typically be stored in the BFD and/or another firmware device that is accessible to the platform (e.g., mounted to the platform's baseboard) and is included in the original computer system. For example, as shown in FIG. 1, firmware code corresponding to a PEIM module A, a PEIM module B and a DXE driver 1 are stored on FD0 while a PEIM module C and a DXE driver 2 are stored on a firmware device FD1. Similarly, PEIM and DEX driver firmware code provided by a BIOS vendor will generally be stored on the BFD and/or another baseboard-mounted firmware device. DXE drivers may also be stored in option ROMs that are provided with various add-on peripheral cards, such as SCSI driver cards that are used to drive SCSI devices, depicted by a DXE driver 3 stored on an option ROM 36 on a SCSI peripheral card 38.

In modern computer systems, most firmware devices comprise flash memory devices, which provide a non-volatile storage means that may be rewritten. As such, an original set of firmware code may be augmented or replaced with new firmware code, including new PEIMs and DXE drivers. This new firmware code will typically be provided via a floppy disk or CD-ROM, or may be downloaded via the Internet.

Generally, the original firmware code that is supplied with a computer system will have been tested for performance, safety, and compatibility, although this isn't guaranteed. In contrast, there is no way to know that a PEIM or DXE driver that is subsequently written to one of the firmware devices in an originally-configured computer system, or is added to the computer system via an add-on firmware device or included in an option ROM corresponding to an add-on periphery card will properly execute, since in many instances the particular configuration of the firmware that is present in the computer system after the new firmware has been added may not have been tested. Furthermore, there is a possibility that third parties may accidentally produce erroneous firmware code or intentionally write rogue firmware code that is purported to be either safe and/or provided by a trusted source, such as a platform vendor. For example, driver provided by various vendors are often available from various driver web sites that may not have a policy for validating every driver that may be downloaded from the web site.

In accordance with one embodiment of the invention, this problem is addressed by providing a mechanism for hardening the EFI 2.0 framework. More specifically, the mechanism invokes the use of a privileged execution space to insulate a Trusted Computing Base (TCB) against errant or malicious driver and application behavior. The components of the architecture include a privileged component, called the EFI 2.0 core framework, which gains initial control of the system. This trusted computing base is depicted as an EFI core framework 40 in FIGS. 1 and 2, and include PEI Framework 22, DXE Framework 26, and EFI Framework 28. There is also a transitive trust relationship wherein a loaded driver can be deemed trusted by the core framework if it meets some criteria prior to the invocation of the driver by the core. The few drivers which compose the TCB, namely SEC, PEI core, DXE core, security PEIM, and security DXE driver, need to undergo more critical security review, possibly by third party agency that will evaluate the modules against something like Common Criteria. Such a review will allow for assertions of trust concerning these components. All other drivers can run in a less-privileged state outside of the TCB and only require such review if they are deemed required to be part of the TCB.

In one embodiment, the invention may be implemented on various Intel processor architectures, including the IA32 processor family, the Itanium™ processor, and the XScale (e.g., StrongARM™) processors. Each of these processor architectures includes user/supervisor hardware protection facilities that partition the access of various software and firmware components between privileged and non-privileged access levels. Specifically, in the foregoing processor architecture this is facilitated through the use of a set of processor "rings" that include a privileged ring 0, and a non-privileged ring 3 (or Kernel/Supervisor state in a 2 level-of-protection processor scheme). In concert with an appropriate operating system, firmware and software executing in ring 0 have access to all of a system's memory space and resources. Thus, these firmware and software components are privileged. In contrast, non-privileged firmware and software executing in ring 3 may not directly access restricted memory and/or resources. In a processor embodiment that supports hardware-based virtualization of the CPU resources, such virtualization can be used and the Virtual Machine Monitor (VMM) that hosts the Ring 0 through Ring 3 code would be the firmware TCB.

For example, in a typical personal computer system, various low-level BIOS services are run in ring 0, while user applications are run in ring 3. In order for the user applications to access memory and other system resources, the user application has to request that the access be performed by an appropriate service running in ring 0. One significant advantage of this partitioning is that it prevents errant code in a user application from corrupting a system resource. For instance, a block device service is run in ring 0 that enables access to a block storage device, such as a hard disk, whereby the only way for a user application to access the block storage device is to make a request through the block device service. As a result, the user application cannot directly access sensitive information on the block storage device, such as the FAT table or partition information on a hard disk. Other memory-located information that may be shrouded from $3^{rd}$ party drivers could include "secrets", such as user passwords, keys used for signature checking of drivers signed using asymmetric/public-key cryptography, and the code which creates hand-off information concerning the platform to the OS loader (such as ACPI tables, memory map, etc). The latter protection is important in that there is an implicit trust assertion made by the OS loader with respect to BIOS when it parses these tables that describe non-discoverable resources.

In accordance with this privileged/non-privileged scheme, embodiments of the present invention enable the trusted computing base components of EFI core framework 40 to be executed in ring 0, while initially restricting execution of PEI modules, DXE drivers, and EFI applications and the EFI library to ring 3, as illustrated in FIG. 2. In this manner, non-trustworthy software components, such as third party PEIMs and DXE drivers, may not directly access sensitive resources, thereby preventing errant or rogue code from harming these resources.

With reference to the flowchart of FIG. 3, a process for hardening an EFI environment proceeds as follows. First, in a block 100 in response to a cold boot or system reset, and reset code portion 12 is executed to set the operating mode of the machine to a "flat" mode, which corresponds to a protected mode with data and code set for a 0–4 Gigabyte mapping. Upon completion of the reset code portion, which is referred to as the SEC or "Security Phase", execution is vectored to the start of PEI framework 22. Next, in a block 102, machine code corresponding to an early portion of the PEI framework is executed to enable "cache-as-RAM."

In brief, "cache-as-RAM" means that all or a portion of the processor on-board cache is configured so that it can be used in a manner similar to accessing the system's random access memory (RAM). Normally, such on-board cache is used to provide immediate access to recently executed code and holds machine instructions that are frequently flushed to store more recently-executed instructions. The process of flushing the machine instructions is automatically performed by the processor, generally in response to a cache "miss." In contrast, the cache-as-RAM cache control scheme must make the cache persistent, wherein the cache is configured so as to never replace or invalidate data written to it by software until explicitly instructed to by the software. Accordingly, the cache should exhibit the following properties:

1. Cache read hits always read from the cache.
2. Cache read misses may update the cache. It is the responsibility of the usage model to ensure cache read misses do not occur by limiting the cacheable range to the size of the data cache and loading the entire range into the cache.
3. Cache write hits always update the cache, though it may generate FSB cycles, see "FSB to Memory Cycle Generation" requirement below.
4. Cache write misses may update the cache and may access memory. The usage model ensures cache write misses do not occur. See item #2 above.
5. Cache lines are never replaced/invalidated unless explicitly done so by software.

The firmware should be able to avoid the cache from being invalidated by hardware mechanisms such as snoop cycles from other processors or memory agents. For example, today's Intel IA32 (e.g., Pentium III and Pentium IV) processors support this configuration by setting CD=1, NW=1 in control register CR0.

However, since the machine is typically in a rudimentary state at this time (UP, all devices just reset), these scenarios are not anticipated to occur. The processor should not invalidate cache lines as a result of normal firmware code execution that results in speculative data fetching of the processor inside or outside the cached range. Further details for enabling cache-as-RAM are discussed below with reference to FIG. 6.

Figure 3:
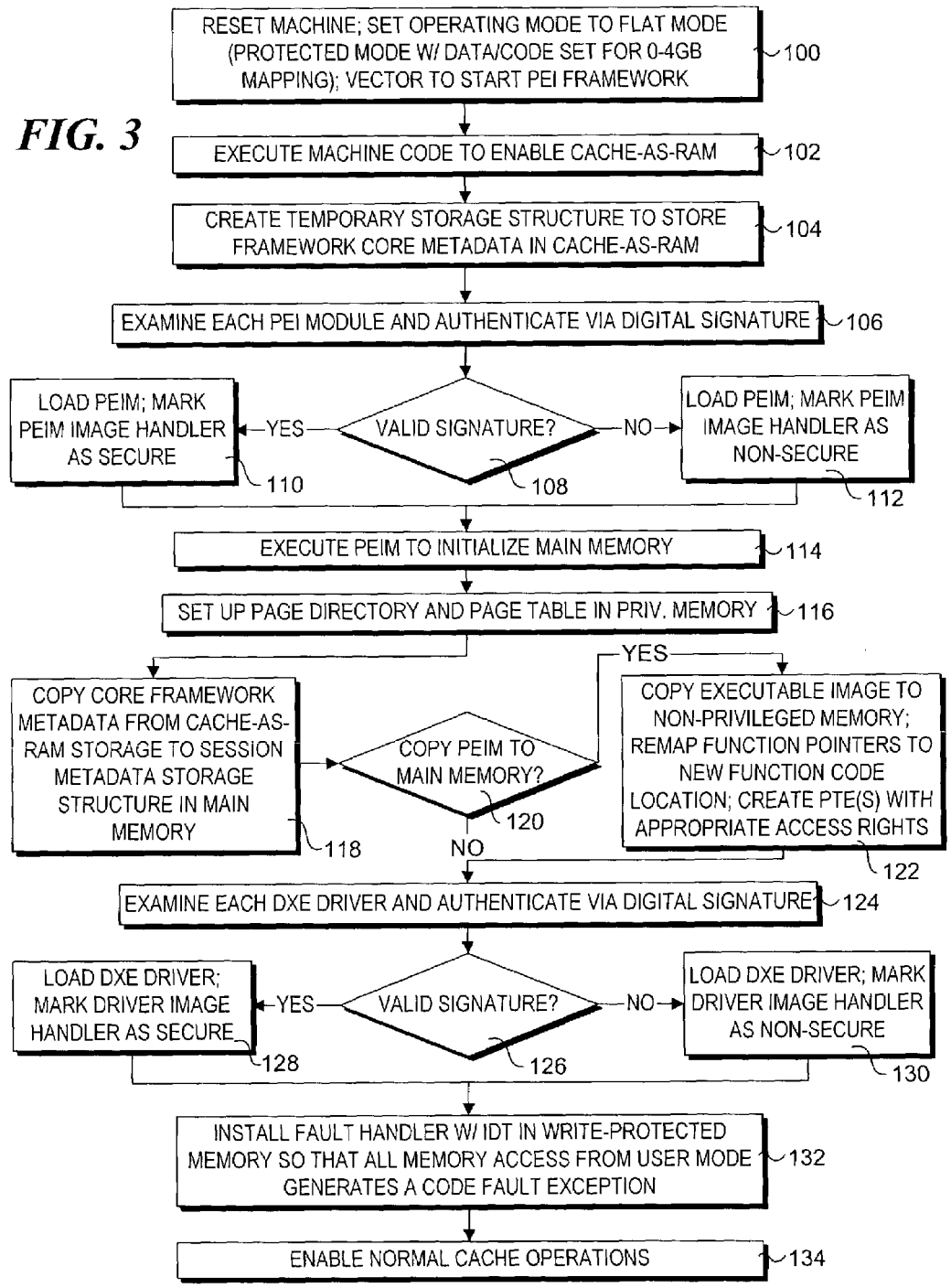
FIG. 3 is a flowchart illustrating the logic and operations performed in accordance with one embodiment of the invention during the PEI and DXE phases of FIG. 2.

Returning to the flowchart of FIG. 3, after the cache-as-RAM has been enabled, a temporary resource metadata structure is created in the cache-as-RAM in a block 104. This temporary resource metadata structure is used to contain a temporary mapping of where resources are loaded, and what the access rights to those resources are. In one embodiment of the invention, the mapping is stored as core framework metadata.

Execution of PEI framework 22 continues, including execution of dispatcher 24, which is used to find and dispatch each PEI module for execution. As each PEI module is found, the module is examined and authenticated via a digital signature in a block 106. In general, the digital signature scheme should ensure that any PEI module that has been altered since it was originally signed by its developer will be identified. In one embodiment of the invention, the digital signature is based on the public key infrastructure X.509 standardv3. The TCB may store the public key using one of several well-known encryption to perform the signature check.

In a block 108 a determination is made to whether the signature is valid. A valid signature indicates that the PEI module is authentic, while an invalid signature indicates it is not. If the signature is valid, the logic proceeds to a block 110 in which the PEI module is loaded and the PEIM image handler is marked as secure. Under the EFI standard, when an EFI component is loaded, such as PEI modules and DXE drivers, an image handler is generated and a corresponding protocol interface is published. Each protocol interface includes pointers to one or more functions provided by the corresponding EFI component. Publication of the protocol interface enables firmware and subsequently-loaded software components, such as operating system components, to access these functions via the protocol interface. As used herein, data pertaining to the image handlers and protocol interfaces are referred to as core framework metadata.

Figure 4:
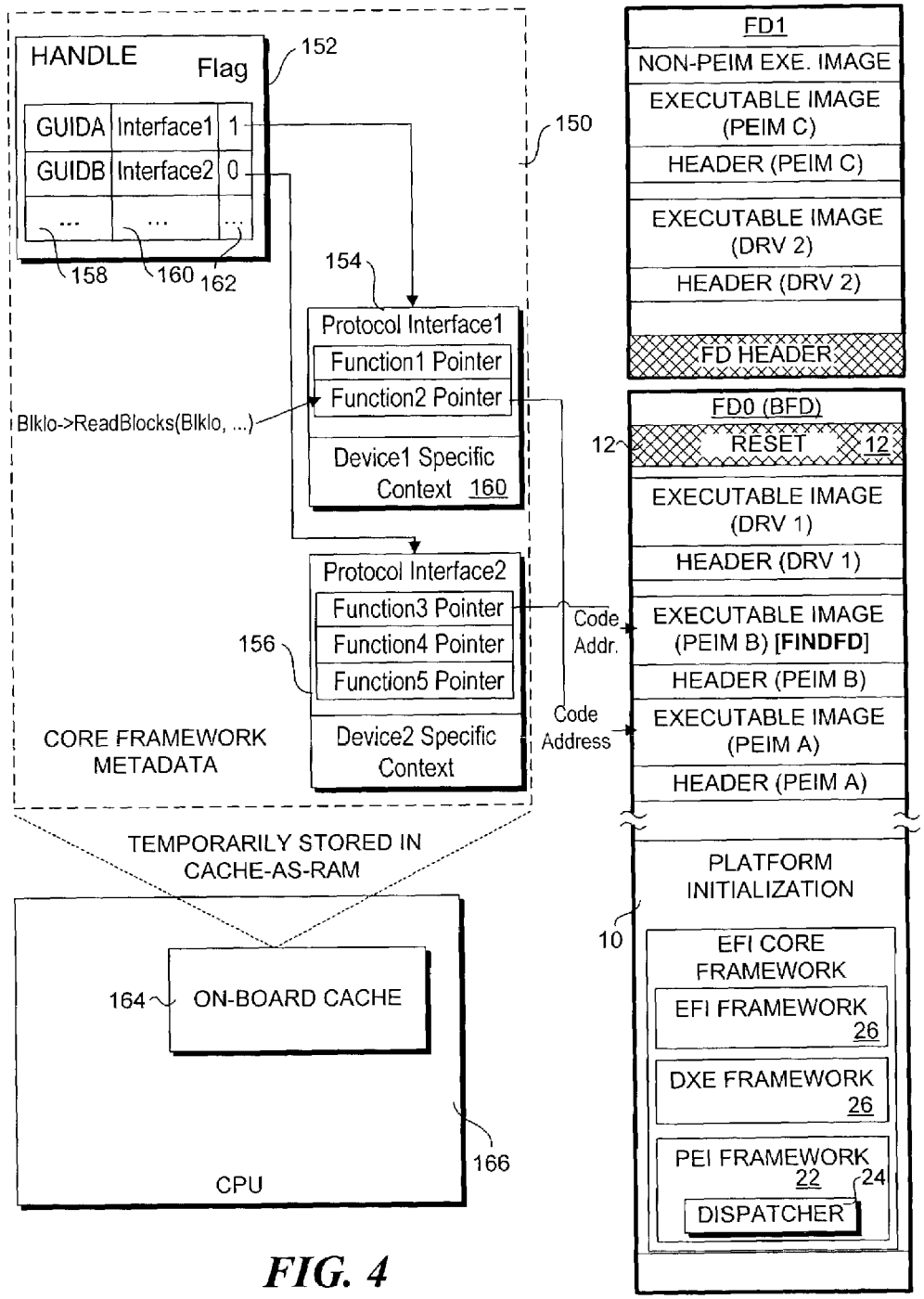
FIG. 4 is a schematic block diagram illustrating a core framework metadata storage structure that is used to store resource configuration metadata in a processor's on-board cache prior to initialization of a computer system's main memory.

An exemplary set of core framework metadata 150 is shown in FIG. 4. The metadata include an image handle table 152 and a pair of protocol interfaces 154 and 156. Image handle table 152 includes a GUID column 158, an interface column 160, and a flag column 162. Each EFI component is identified by a GUID (globally unique identifier) that is included in that EFI component's header; the GUID values are stored in GUID column 158. An identifier for the EFI component's protocol interface is stored in interface column 160. This information is used to map the EFI component's GUID to its function interface.

During PEI phase 14, system memory is not available. Accordingly, the function code provided by each of the PEI modules is stored in the PEI module's executable image. For example, protocol interface 154 includes pointers to Functions 1 and 2, comprising code contained in the executable image of PEI module A. Protocol interface 156 includes pointers to Functions 3, 4, and 5, comprising code contained in the executable image of PEI module B.

Since system memory is not available, there needs to be a mechanism for storing the core framework metadata until it can be stored in system memory. This is where the cache-as-RAM is implemented. In one embodiment of the invention, core framework metadata 150 is stored in a cache-as-RAM data structure stored in an on-board cache 164 of a processor 166.

Returning to block 110, since the signature for the PEI module was determined to be valid, its corresponding image handler is marked as secure. As discussed above, this is performed by storing a "1" in flag column 162. In contrast, if it is determined in decision block 108 that the PEI module's signature is not valid, the logic proceeds to a block 112 wherein the PEI module is loaded and the image handler for the PEI module is marked as non-secure by setting the value in flag column 162 to "0." Upon completion of either of blocks 110 or 112, the logic flows to a block 114 in which the PEI module that initializes the system main memory (i.e., normal RAM) is executed, thereby enabling the system's RAM to be used.

In accordance with one embodiment of the invention, trusted PEI modules are enabled to access data stored in "trusted" memory, while PEI modules that are not trusted are prevented from accessing the "trusted" memory. Such trusted memory is also commonly referred to as "protected" or "privileged" memory. Modern processors and operating systems provide built-in mechanisms for partitioning privileged memory from non-privileged memory. Typically, this may be done using a memory paging scheme, also known as a page-level protection scheme, wherein parameters in a page table entry (PTE) and/or corresponding page directory entry that maps to one or more PTE's is evaluated to determine whether the memory referenced by the page may only be read, or may be fully accessed (e.g., read and/or written to).

Figure 5:
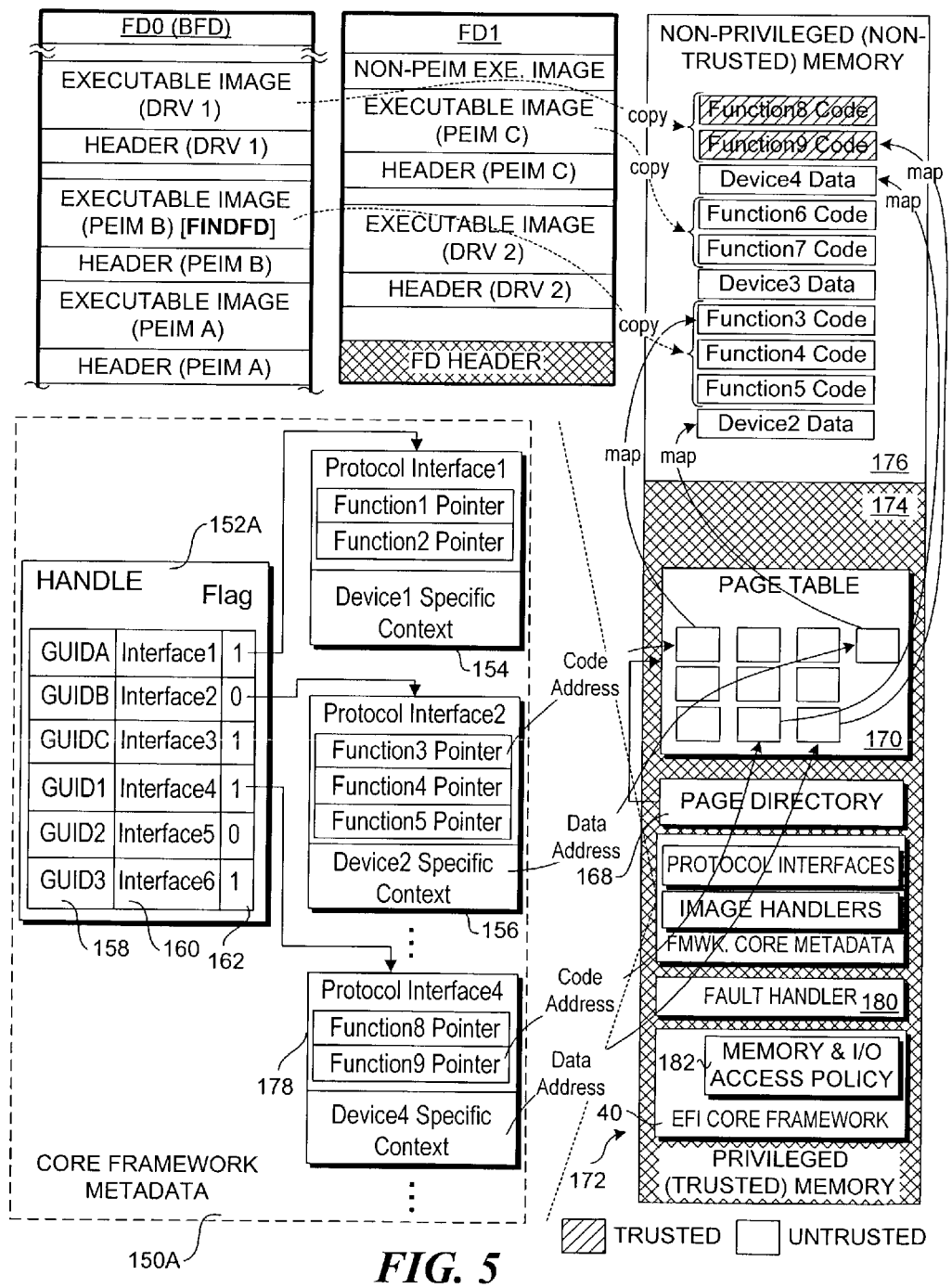
FIG. 5 is a schematic block diagram illustrating a memory page access scheme in accordance with one embodiment of the invention by which access to memory by extended firmware components is restricted based on whether the extended firmware components are trustworthy.

In general, page-level protection can be used alone or applied to memory segments. When page-level protection is used with a flat memory model, it allows supervisor code and data (i.e., the operating system kernel or executive) to be protected from user code and data (i.e., user application programs). It also allows pages containing code to be write protected. When the segment- and page-level protection are combined, page-level read/write protection allows more protection granularity within segments. With page-level protection (as with segment-level protection), each memory reference is checked to verify that protection checks are satisfied. All checks are made before the memory cycle is started, and any violation prevents the cycle from starting and results in a page fault exception being generated. Because the checks are performed in parallel with address translation, there is no observed performance penalty Typically, page-level protection schemes are implemented using a page directory and one or more page tables. Accordingly, a page directory and page table is set up in the system's main memory in a block 116, as depicted by a page directory 168, a page table 170 and main memory 172 in FIG. 5. Also as depicted in FIG. 5, main memory 166 includes a privileged (i.e., trusted) portion 174 and a non-privileged (i.e., non-trusted) portion 176. For convenience, the privileged and non-privileged portions of the main memory are shown as contiguous; as will be recognized by those skilled in the art, in actual practice the main memory may be interlaced with privileged and non-privileged portions.

Next, in a block 118 the core framework metadata that was generated during PEI phase 14 (e.g., core framework metadata 150) is copied to the privileged portion of the main memory, as depicted by framework core metadata 174. As an option, the executable image for a given PEI module may also be copied from the firmware device on which it is stored to the non-privileged portion of memory. A corresponding determination of whether a PEI module is to be copied into main memory is made in a decision block 120. If the answer is YES, the PEIM is copied into the non-privileged portion of memory in a block 122. In addition, the function pointers are remapped to point to the new location of the function code. This will typically comprise a pointer to a memory page table entry (PTE) that provides a mapping to where in physical memory the function's code is stored. If the function corresponds to a trusted PEI module, the PTE is marked as corresponding to privileged memory. If the PEI module was determined to be untrustworthy (i.e., does not have a valid signature), the PTE is marked as corresponding to non-privileged memory. If the PEI module provides access to a specific device, an appropriate PTE is also generated corresponding to where data used for accessing the device is stored in the main memory, and whether the data is considered to be trusted or not.

FIG. 5 illustrates a situation in which the executable image containing the function code for PEI module A is not copied into the system's main memory, while the executable image containing the function code for PEI module B is copied into the main memory (depicted as Function3 Code, Function4 Code, and Function 5 Code). Since the flag corresponding to protocol interface 156 is marked as non-trusted, the corresponding PTE's for each of functions 3, 4, and 5, as well as for the data pertaining to the device accessed by these functions (depicted as Device 2 Data) contain appropriately configured parameters to let the system know that these functions and data are not trustworthy, and thus may only access non-privileged memory. It is noted that the particular parameters for the PTE's are processor architecture dependent and are well-known in the art; accordingly, specific details for effecting such memory access schemes are not provided herein.

At this point, the processing of DXE drivers begins. First, each DXE driver is examined in a block 124 to see if it is authentic via its digital signature. If the signature is valid, as determined in a block 126, the executable image for the DXE driver is loaded into main memory, and a corresponding image handler is marked as secure in a block 128. If the signature is determined to be invalid, the executable image for the DXE driver is loaded into main memory and a corresponding image handler is marked as non-secure. Various signature schemes and the associated trust hierarchy can vary per the policy of the security driver/PEIM in the TCB.

In a manner similar to loading a PEI module discussed above, when a DXE driver is loaded, an image handler entry is created in the image handler table, and a protocol interface by which functions provided by the DXE driver is published. For example, as shown in FIG. 5, the image handle table, now labeled as image handle table 152A, includes additional entries corresponding to the loading of DXE drivers 1, 2, and 3 (i.e., the rows including Interfaces 4, 5, and 6). Furthermore, the core framework metadata, now labeled core framework metadata 150A, further includes a protocol interface 178. (It is noted that core framework metadata would also include protocol interfaces for Interfaces 3, 5 and 6, which have been omitted from FIG. 5 for clarity.) Additionally, Functions 8 and 9 corresponding to the executable image of DXE Driver 1 are depicted as being copied into non-privileged memory 176, along with Functions 6 and 7, the latter of which correspond to the executable image of PEI module C. Again, for clarity, the functions corresponding to the executable images of DXE drivers 2 and 3 are not shown in the FIG. 5; it will be understood that these functions would also be copied into non-privileged portions of the system's main memory.

Figure 7:
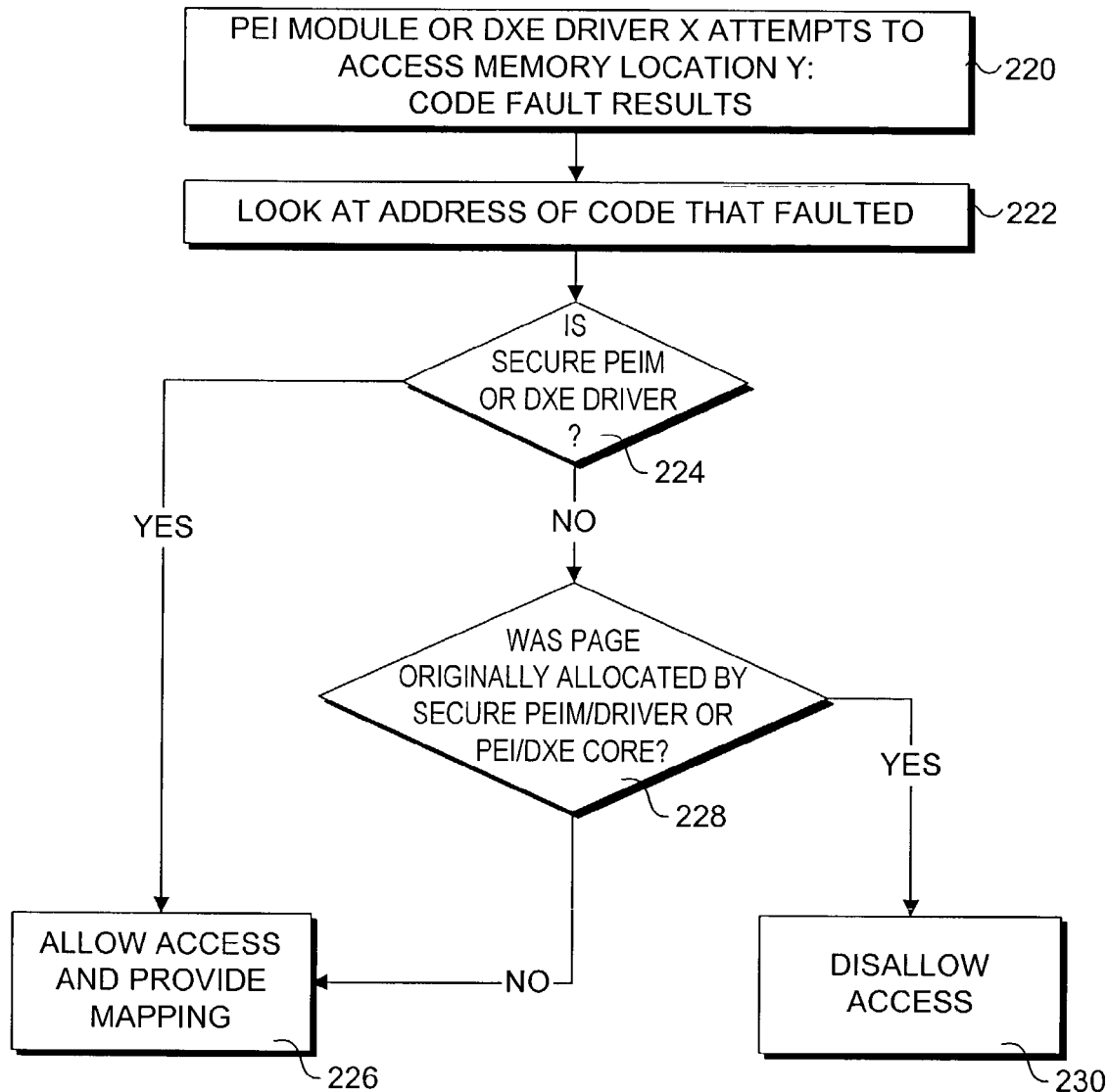
FIG. 7 is a flowchart illustrating the logic and operations implemented by one embodiment of the invention is response to a memory access request.

As discussed above, in accordance with one embodiment of the invention, the executable images (i.e., function code) for each DXE driver is loaded into the non-privileged portion of the main memory. However, this does not mean that the code itself if not trustworthy. Rather, the code is located in the non-privileged portion of the main memory so that a memory access checking mechanism can be invoked whenever code in a non-privileged memory page is accessed. Such a non-privileged memory page access is commonly referred to as a user-mode access. This corresponds to a typical operating system memory-partitioning scheme, in which the OS kernel is stored in privileged memory, and user applications are stored in non-privileged memory and are executed in a processor user-mode that prevents the code in the user applications from directly accessing data or code in privileged memory. In accordance with the memory access checking mechanism, a fault handler 180 with an appropriate interrupt description table (IDT) is installed in a write-protected portion of privileged memory 174 in a block 132 so that all memory access from a user mode (i.e., stored in a non-privileged memory page) generates a code fault exception. In essence, the desire is to trap memory access request from firmware and software code operating in the processor's non-privileged mode (e.g., user mode or ring 3 in an Intel® processor) prior to providing access to the requested memory. Memory access is then provided in accord with the logic of FIG. 7 described below.

The DXE phase is completed in a block 134, wherein the cache is reconfigured to enable normal cache operations. It is noted that this operation may be performed any time after the framework core metadata has been copied to the privileged system memory.

The foregoing scheme may be summarized as follows. The trusted computing base (i.e., the PEI core framework) keeps a list of trusted images and data allocations via a combination of the page directory/page table entries and the PEI framework core metadata. This comprises a two-level list of pointers. The PTE's point to regions of memory and include parameters corresponding to characteristics of that memory (e.g., physical location, access rights, present/not present, etc.). The metadata identifies whether the PEI modules and DXE driver functions and corresponding device data is trustworthy. As described below in further detail, the system then invokes a memory policy component to enable trustworthy components to access privileged memory, while allowing non-trustworthy EFI components to only access non-privileged memory.

With reference to the flowchart of FIG. 6, an on-board cache for an Intel® IA32 processor may be configured to operation as cache-as-RAM (i.e., pseudo RAM) as follows. First, in a block 200, the default memory range type is set to UC (uncached). The MTRRs (Memory Type Range Register—a special type of IA32 Model Specific Register—MSR) are then set to a single cacheable range that is not mapped to the system memory range of the chipset or is mapped to overlay the available system ROM region of the chipset or system board in a block 202. In a block 204 the cache range is set to WB (Write-Back) or WT (Write-through), and the cache is invalidated with INVD (Invalidate Instruction) in a block 206.

In a block 208, a temporary RAM or "tempRAM" region is defined. All location in the tempRAM are read to set all cache lines to the shared (S) state. All locations in the tempRAM area are then written with 00h to set all cache lines to the exclusive (E) state. The cache is then locked in a block 210 to prevent modified data from being written externally from the cache, setting CD=1 and NW=0.

As discussed above, in accordance with one embodiment of the present invention a memory access scheme is provided to control access to privileged (i.e., trusted) memory. The memory access scheme uses the fault handler installed in block 128 above to control access to the system memory when firmware or software code that is executed in the processors user mode. Typically, the logic for handling the code fault may be implemented in one or more associated interrupt handlers identified by the interrupt description table.

Figure 6:
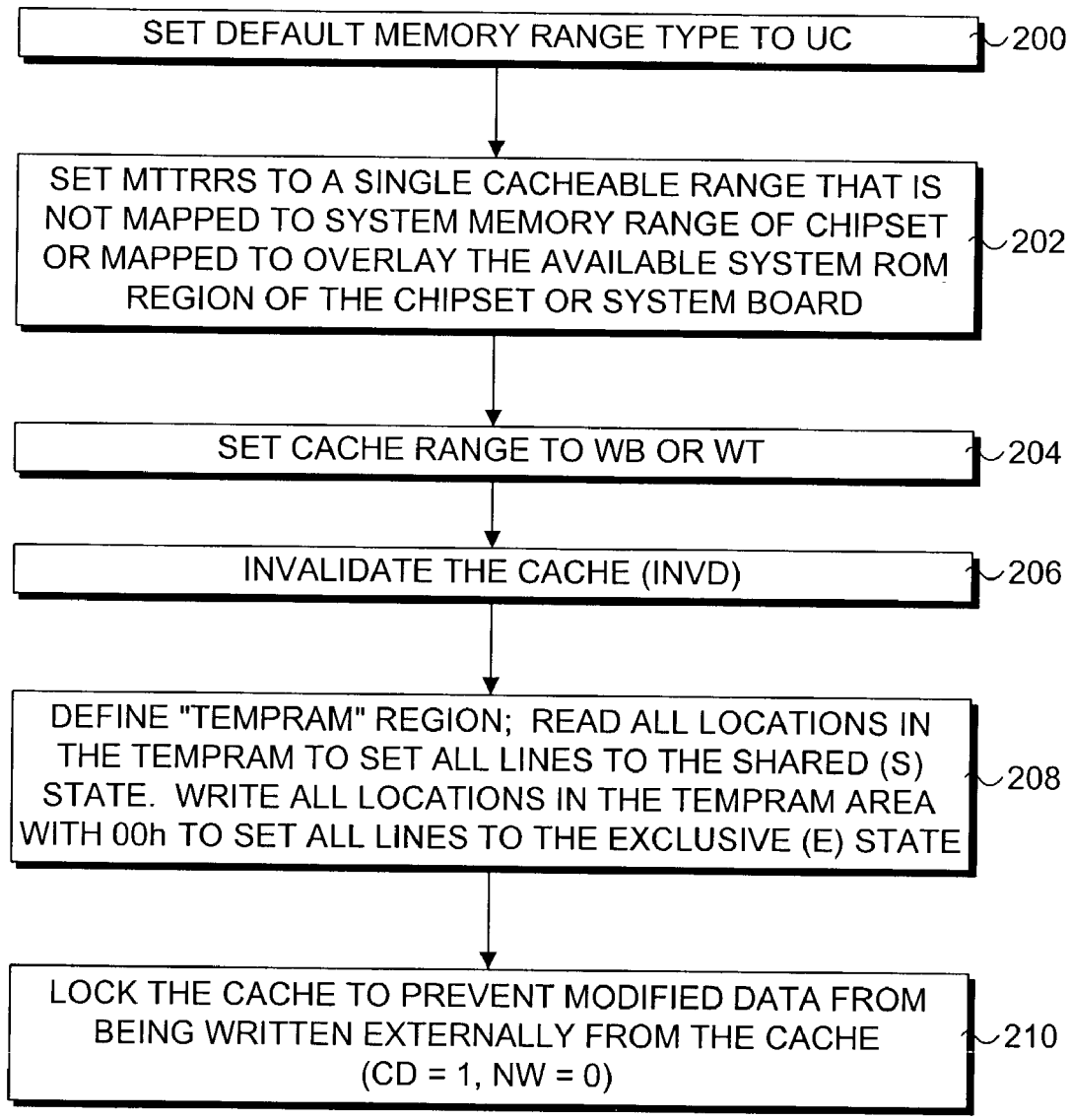
FIG. 6 is a flowchart illustrating the operations for configuring an on-board processor cache to function as a pseudo RAM in accordance to one embodiment of the invention.

For example, suppose that a PEI module or a DXE driver X attempts to access memory location Y, as depicted by a block 220 in the flowchart of FIG. 6. Since code corresponding to PEI modules and DXE drivers is run in the non-privileged execution mode, a code fault will be generated is response to the memory access requests. The address of the code that faulted is then identified in a block 222.

Based on the combination of the memory map and core framework metadata above in the privileged memory space, a determination is made in a decision block 224 to whether the code corresponds to either a secure PEI module or a secure DXE driver. If it does, the logic proceeds to a block 226 in which the memory access is allowed. This correlates to allowing secure extended firmware components to access both privileged and non-privileged memory. If memory access request was made by a non-secure extended firmware component, the answer to decision block 224 will be no, and the logic will proceed to a decision block 228 in which a determination is page to whether the requested memory page was originally allocated by a secure PEI module or DXE driver or by the PEI/DXE core framework. Effectively, this decision block is determined whether the page was originally allocated by a trusted firmware component.

If the answer to decision block 228 is YES (TRUE), the memory access is disallowed, as provided by a block 230. This ensures that non-secure PEI modules and DXE drivers may not access privileged memory. In contrast, if the page was allocated by a non-PEIM or DXE-related module or application, the logic proceeds again to block 226 in which the memory access is allowed. This essentially says to let the operating system (once it is loaded) handle access to system memory when the access is not made by a core or extended firmware component.

In one embodiment the logic and operations for memory access operations is provided by a memory and I/O (input output) access policy component 182 that comprises a portion of EFI core framework 40, as shown in FIG. 5. As its name implies, this component also provides a policy for accessing the system's I/O ports. Paging can protect memory and memory-mapped I/O. In one embodiment, I/O port level protection may also be provided by setting appropriate I/O permission map bits in an IA32 processor's Task State Segment (TSS). The I/O permission bit map provides a mechanism for permitting limited access to specific I/O ports by less privileged programs or tasks and for tasks operating in virtual-8086 mode. Itanium and StrongArm processors only have memory-mapped I/O (i.e., no "I/O space like IA32"), so paging suffices wholly for the latter CPU's protection model. These ports may be protected in a manner similar to that used for memory protection, except that a different mechanism is used in place of the page directory/page table scheme used for memory accesses. Such port protection schemes are well-known in the art.

This chain-of-trust maintenance across pre-boot firmware components provides a model for having trust assertion being made about the firmware. The challenger who questions this trust assertion can include but is not limited to operating system loaders, which are given control by the firmware.

Exemplary Computer System for Practicing the Invention

Figure 8:
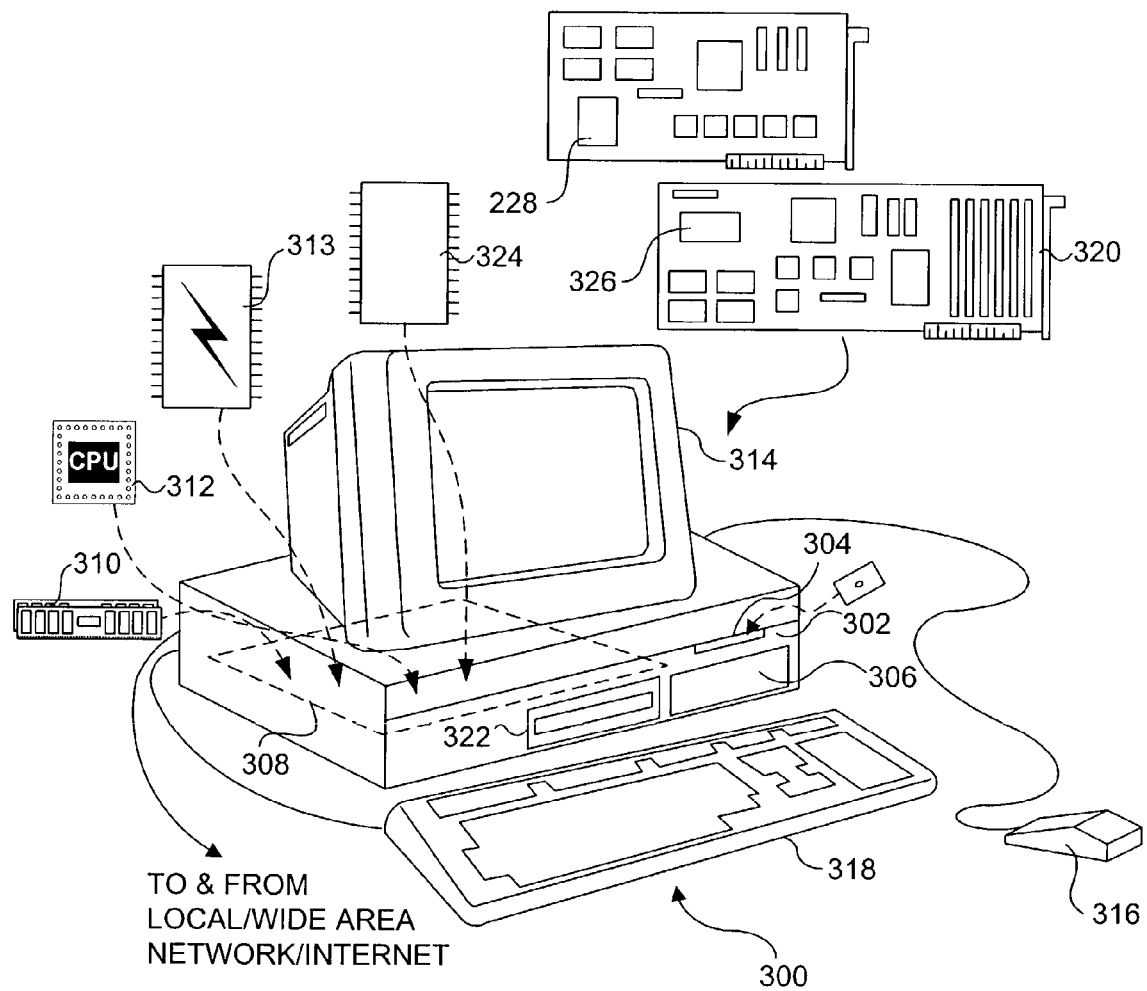
FIG. 8 is a schematic diagram illustrating a conventional computer system that may be used to practice the illustrated embodiments of the present invention.

With reference to FIG. 8, a generally conventional computer 300 is illustrated, which is suitable for use in connection with practicing the present invention, and may be used for running firmware instructions that implement the various operations of the embodiments of the invention discussed above. Examples of computers that may be used include PC-class systems operating the Windows NT, 95, 98, 2000, or XP operating systems, various workstations operating UNIX-based operating systems, and various computer architectures that implement LINUX operating systems. Computer 300 is also intended to encompass various server architectures, as well as computers and servers having multiple processors.

Computer 300 includes a processor chassis 302 in which are mounted a floppy disk drive 304, a hard drive 306, a motherboard 308 populated with appropriate integrated circuits including memory 310, one or more processors (CPUs) 312, and a power supply (not shown), as are generally well known to those of ordinary skill in the art. It will be understood that hard drive 306 may comprise a single unit, or multiple hard drives, and may optionally reside outside of computer 300. The motherboard also includes a boot firmware device (BFD) 313 on which at least early firmware instructions are stored to initialize the computer during a cold boot or in response to a system reset, including the EFI core framework discussed above. A monitor 314 is included for displaying graphics and text generated by software programs and program modules that are run by the computer. A mouse 316 (or other pointing device) may be connected to a serial port (or to a bus port or USB port) on the rear of processor chassis 302, and signals from mouse 316 are conveyed to the motherboard to control a cursor on the display and to select text, menu options, and graphic components displayed on monitor 314 by software programs and modules executing on the computer. In addition, a keyboard 318 is coupled to the motherboard for user entry of text and commands that affect the running of software programs executing on the computer.

Computer 300 also includes a network interface card 320 or built-in network adapter for connecting the computer to a computer network, such as a local area network, wide area network, or the Internet. The computer may also include one or more peripheral device cards 321, such as video cards, sound cards, SCSI device drive cards, etc., or circuitry equivalent thereto that is provided on motherboard 308. Computer 300 may also optionally include a compact disk-read only memory (CD-ROM) drive 322 into which a CD-ROM disk may be inserted so that executable files and data on the disk can be read for transfer into the memory and/or into storage on hard drive 306 of computer 300. Other mass memory storage devices such as an optical recorded medium or DVD drive may be included.

The various PEI modules and DXE drivers that are operated on by embodiments of the invention may be provided in BFD 213, or in other firmware devices accessible to the computer. For example, these firmware devices may include an add-on firmware device 324 coupled to motherboard 308, or option ROMs contained on peripheral cards, depicted as option ROMs 326 and 328.

The instructions comprising the firmware that causes the CPU to implement the operations of the embodiments of the present invention discussed above will likely be provided with BFD 313, or provided in an upgrade BIOS component that is used to replace or augment BFD 313. In some instances, BFD 313 will comprise a flash memory component (or a similar rewritable component), whose instructions may be rewritten with a coded firmware image that is either stored on a floppy disk, CD, or DVD, or downloaded as a carrier wave to computer 300 via a computer network such as the Internet.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method comprising:
   segregating a plurality of firmware components that are executed during initialization of a computer system prior to launching an operating system on the computer system into trusted core firmware components and extended firmware components;
   executing the trusted core firmware components using a privileged execution mode during the initialization; and
   executing the extended firmware components in a non-privileged execution mode during the initialization.

2. The method of claim 1, further comprising:
   providing a memory access mechanism that partitions system memory into a privileged memory space and a non-privileged memory space;
   enabling the trusted core firmware components to directly access memory in both the privileged and non-privileged memory spaces; and
   restricting the extended firmware components to directly access only the non-privileged memory space.

3. The method of claim 2, wherein the memory access mechanism includes memory access data including indicia identifying a trustworthiness of each firmware component and data identifying any memory pages allocated to or by that firmware component.

4. The method of claim 2, wherein the computer system includes a processor having a built-in memory cache, further comprising:
configuring the memory cache to operate as pseudo random access memory (RAM); and
storing the metadata in the memory cache.

5. The method of claim 4, further comprising:
copying the memory access data into system RAM after the system RAM has been initialized; and
restoring the memory cache to a normal operational mode.

6. The method of claim 2, further comprising:
classifying each extended firmware components as a secure or non-secure extended firmware component; and
allowing secure extended firmware components to directly access both the privileged and non-privileged memory spaces while allowing non-secure extended firmware components to only directly access the non-privileged memory space.

7. The method of claim 6, wherein each extended firmware component is initially stored in a firmware device as an executable image, and classifying the extended firmware components comprises:
authenticating the executable image of each firmware module; and
marking the executable image as secure if it is determined that the executable image is authentic, otherwise marking the executable image as non-secure.

8. The method of claim 6, wherein the authentication is determined using a digital signature.

9. The method of claim 6, further comprising:
installing a fault handler with an interrupt description table to generate a code fault exception in response to a memory access request from firmware or software code executing in the non-privileged mode;
examining an address of the code fault exception;
allowing access to the memory in accordance with the memory access request if the address corresponds to a secure extended firmware component.

10. The method of claim 9, further comprising:
determining if a memory page corresponding to the memory access request was originally allocated by a secure extended firmware component or a trusted core firmware component; and
allowing access to the memory page if it was not, otherwise disallowing access to the memory page.

11. The method of claim 1, wherein the trusted core firmware components support an extensible firmware interface (EFI) standard and extended firmware components include at least one PEI (pre-EFI initialization) module.

12. The method of claim 11, wherein the extended firmware components include at least one DXE (driver execution environment) driver.

13. An apparatus comprising:
a non-volatile memory component on which a plurality of instructions are stored comprising a set of trusted core firmware components that when executed by a processor initialize a computer system prior to launching an operating system on the computer system by performing the operations of:
executing the trusted core firmware components using a privileged execution mode of the processor;
locating a plurality of extended firmware components stored on the non-volatile memory component and/or other firmware devices in the computer system; and
executing the extended firmware components using a non-privileged execution mode of the processor.

14. The apparatus of claim 13, wherein the computer system includes a system memory and wherein execution of the trusted core firmware components further performs the operations of:
partitioning the system memory into a privileged memory space and a non-privileged memory space;
defining memory access data that includes indicia identifying a trustworthiness of each firmware component and the memory pages allocated to and/or by that firmware component;
enabling the trusted core firmware components to directly access memory in both the privileged and non-privileged memory spaces; and
restricting any non-trusted extended firmware components from directly accessing the privileged memory space.

15. The apparatus of claim 14, wherein the computer system includes a processor having a built-in memory cache and system random access memory (RAM), and wherein execution of the trusted core firmware components further performs the operations of:
configuring the memory cache to operate as pseudo RAM;
storing at least a portion of the memory access data in the memory cache;
copying said at least a portion of the memory access data into the system RAM after the system RAM has been initialized; and
restoring the memory cache to a normal operational mode.

16. The apparatus of claim 14, wherein execution of the trusted core firmware components further performs the operations of:
classifying each extended firmware component as a secure or non-secure extended firmware component; and
allowing secure extended firmware components to directly access both the privileged and non-privileged memory spaces while allowing non-secure extended firmware components to only directly access the non-privileged memory space.

17. The apparatus of claim 16, wherein execution of the trusted core firmware components further performs the operations of:
installing a fault handler to generate a code fault exception in response to a memory access request from firmware or software code executing in the non-privileged mode;
examining an address of the code fault exception;
allowing access to the memory in accordance with the memory access request if the address corresponds to a secure extended firmware component.

18. The apparatus of claim 17, wherein execution of the trusted core firmware components further performs the operations of:
determining if a memory page corresponding to the memory access request was originally allocated by a secure extended firmware component or a trusted core firmware component; and
allowing access to the memory page if it was not originally allocated by a secure extended firmware component or a trusted core firmware component, otherwise disallowing access to the memory page.

19. A method for initializing a computer system, comprising:
executing firmware code corresponding to a pre-extensible firmware interface initializing (PEI) framework using a privileged execution mode of a processor for the computer system;
locating one or more PEI modules that are stored on one or more firmware devices in the computer system; and
executing firmware code corresponding to said one or more PEI modules using a non-privileged execution mode of the processor.

20. The method of claim 19, further comprising:
executing firmware code corresponding to a driver execution environment (DXE) framework using the privileged execution mode of the processor;
locating one or more DXE drivers that are stored on the firmware device(s) in the computer system; and
executing firmware code corresponding to the DXE drivers using the non-privileged execution mode of the processor.

21. The method of claim 20, further comprising:
executing firmware code corresponding to an extensible firmware interface (EFI) framework using the privileged execution mode of the processor;
executing firmware code corresponding to EFI applications and/or an EFI library using the non-privileged execution mode of the processor.

22. The method of claim 19, wherein the computer system includes a processor having a built-in memory cache, further comprising:
configuring the memory cache to operate as pseudo random access memory (RAM); and
creating a temporary storage structure in the memory cache;
determining whether each of said one or more PEI modules is secure or non-secure; and
storing indicia in the temporary storage structure identifying which PEI modules are secure and which are non-secure.

23. The method of claim 22, wherein each PEI module comprises an executable image and publishes an interface that enables services provided by that PEI module to be called via an image handler, further comprising marking the image handler with a flag indicating whether the PEI module corresponding to the image handler is secure or non-secure.

24. The method of claim 22, further comprising:
copying the indicia identifying which PEI modules are secure and which are non-secure from the temporary storage structure into system RAM after the system RAM has been initialized; and
restoring the memory cache to a normal operational mode.

25. The method of claim 22, further comprising:
installing a fault handler to generate a code fault exception in response to a memory access request from firmware or software code executing in the non-privileged mode of the processor;
examining an address of the code fault exception;
allowing access to the memory in accordance with the memory access request if the address corresponds to a secure PEI module.

26. The method of claim 25, further comprising:
determining if a memory page corresponding to the memory access request was originally allocated by a firmware component corresponding to the PEI Framework, the DXE Framework, the EFI Framework, or is a secure PEI module; and
allowing access to the memory page if it was not, otherwise disallowing access to the memory page.

27. The method of claim 20, further comprising:
determining whether each of said one or more DXE drivers is secure or non-secure; and
storing indicia in a privileged portion of system memory identifying which DXE drivers are secure and which are non-secure.

28. The method of claim 27, wherein each DXE driver comprises an executable image and publishes an interface that enables services provided by that DXE driver to be called via an image handler, further comprising marking the image handler with a flag indicating whether the DXE driver corresponding to the image handler is secure or non-secure.

29. A computer system comprising:
system memory;
a processor, coupled to the system memory; and
a first firmware device coupled to the processor on which a plurality of instructions are stored comprising at least one extended firmware component and a set of trusted core firmware components and that when executed by the processor initialize the computer system prior to launching an operating system on the computer system by performing the operations of:
executing the trusted core firmware components using a privileged execution mode of the processor; and
executing said at least one extended firmware component using a non-privileged execution mode of the processor.

30. The computer system of claim 29, further comprising a second firmware device coupled to the processor on which at least one extended firmware component is stored, wherein execution of the trusted core firmware components further performs the operations of:
locating said at least one extended firmware component on the second firmware device; and
executing said at least one extended firmware component on the second firmware device using the non-privileged execution mode of the processor.

31. The computer system of claim 29, wherein execution of the trusted core firmware components further performs the operations of:
partitioning the memory into a privileged memory space and a non-privileged memory space;
defining memory access data that includes indicia identifying a trustworthiness of each extended firmware component and the memory pages allocated to and/or by that extended firmware component;
enabling the trusted core firmware components to directly access memory in both the privileged and non-privileged memory spaces; and
restricting any non-trusted extended firmware components from directly accessing the privileged memory space.

32. The computer system of claim 31, wherein the processor includes a built-in memory cache, and wherein execution of the trusted core firmware components further performs the operations of:
configuring the memory cache to operate as pseudo random access memory (RAM);
storing at least a portion of the memory access data in the memory cache prior to initialization of the system memory;
copying said at least of portion of the memory access data into the system memory after the system memory has been initialized; and
restoring the memory cache to a normal operational mode.

* * * * *